United States Patent [19]

Headley

[11] 4,181,534

[45] Jan. 1, 1980

[54] PROCESS FOR PRODUCING A CLEAN PENTOSAN ENRICHED PERICARP

[75] Inventor: Verl E. Headley, Willowbrook, Ill.

[73] Assignee: CPC International Inc., Englewood Cliffs, N.J.

[21] Appl. No.: 832,319

[22] Filed: Sep. 12, 1977

[51] Int. Cl.$^2$ ............................................. C13L 1/02
[52] U.S. Cl. ........................................ 127/67; 241/7;
       241/8; 241/9; 426/623
[58] Field of Search ................ 127/23, 24, 25, 65,
       127/67, 68, 69; 241/7, 8, 9

[56] References Cited

U.S. PATENT DOCUMENTS

| | | | |
|---|---|---|---|
| 2,192,212 | 3/1940 | Wagner | 127/68 |
| 2,347,215 | 4/1944 | Pattee | 127/67 |
| 2,472,971 | 6/1949 | Hansen | 127/68 |
| 3,222,183 | 12/1965 | Rozsa | 241/9 X |
| 3,399,839 | 9/1968 | Anderson | 241/7 X |
| 3,446,665 | 5/1969 | Castiello | 127/23 X |
| 3,857,987 | 12/1974 | Rogols | 127/68 X |
| 3,979,375 | 9/1976 | Rao | 241/8 X |
| 4,126,707 | 11/1978 | Hart | 241/7 X |

*Primary Examiner*—Sidney Marantz
*Attorney, Agent, or Firm*—David H. LeRoy; Stanley M. Parmerter

[57] ABSTRACT

Process for producing a clean pentosan-enriched pericarp from mixed fibre obtained from the hydroprocessing of corn. The mixed fibre is dried to a moisture content of from about 42% to about 60% by weight and abraded so as to obtain a clean pentosan-enriched pericarp fraction and a fines fraction. A feed product may be obtained with further processing.

10 Claims, No Drawings

PROCESS FOR PRODUCING A CLEAN PENTOSAN ENRICHED PERICARP

FIELD OF INVENTION

This invention relates to a process wherein a mixed fiber stream from corn hydroprocessing is subjected to abrasion at a critical moisture level and to a pentosan enriched pericarp product, fines fraction, and fiber and feed products produced therefrom.

BACKGROUND OF THE INVENTION

In present corn wet milling or hydroprocessing operations, the so-called "mixed fiber stream" is separated from the "millstarch stream." For a discussion of the manufacture of corn, see *Starch Chemistry and Technology*, Whistler and Paschall Editors, Vol. II, Chapt. I, pp. 1-51 Academic Press, N. Y. (1967).

Prior to milling corn is normally softened by steeping in water at about 48° C. to 52° C. for 30 to 50 hours. Sulfur dioxide may be included in the steeping medium to assist in softening and to prevent growth of microorganisms.

Following the steeping the corn is subjected to a milling operation in which over half of the original starch and gluten is freed. Currently, most milling plants use hydroclone separators to separate the germ or gluten from the starch.

Newer types of mills such as impact mills (i.e., Entoleter mill) are preferred by many corn millers. Machines known as bran dusters or impact finishers utilize the principle of impact-abrasion for separating endosperm from wheat bran at 14%-16% moisture. Processing wheat bran with these machines at such a low initial moisture level, though typical for the industry, not only produces a significant amount of small bran particles but also leaves endosperm adhering to the surface of the larger bran particles. Starch released by milling is then separated from fiber through screening operations. The defibrated mixture of starch and protein is known as the "millstarch stream".

The separated fiber is known as the so-called "mixed fiber stream." The "mixed fiber stream" contains a pericarp or fruit wall portion which retains attached endosperm fragments broken away in the preceding steeping, milling, and separation operations and other portions hereinafter described.

The *pericarp* is the smooth outer covering of the corn kernel composed of elongate cells packed into a dense tissue. The pericarp contains pentosan which is a complex carbohydrate (i.e., hemicellulose) that upon hydollysis yields five-carbon-atom sugars. The tip cap is the remnant of the attachment of the kernel to the cob. Beneath the tip cap at the base of the germ is a black tissue known as the hilar layer. A *spongy layer* of cross and tube cells lie under the dense cells or tissue. Beneath the spongy cells is a thin membrane known as the *seed coat or testa*. Below the testa is the *aleurone layer*, a tough tissue about one cell in thickness. The *endosperm* contains the starchy material and consists of an outer horny endosperm portion that lies below the aleurone layer and a floury endosperm portion.

The "mixed fiber stream" according to present industry practice is partially dewatered to about 62-65% moisture by centrifuge or pressing operations, then flash or rotary dried, and the mixed fibers combined with various other by-products (i.e., corn cleanings, spent germ flakes, steepwater and the like) to produce animal feed which may be further processed for granulated or pellet feeds. Thus, the total mixed fiber is utilized in the animal feed.

In the past milling processes are known which slough off or abrade corn to obtain an impure pericarp which contains large quantities of endosperm. Elimination of the use of Buhr mills in modern corn wet milling plants resulted in one mixed fiber stream instead of the coarse fiber and fine fiber portions generated by the Buhr mills. Nevertheless, the impure pericarp with attached endosperm still remains a product of modern processes and usually passes directly into feed products. There has been no suggestion in the prior art for further processing of the "mixed fiber stream" to isolate an improved clean pentosan enriched pericarp fraction.

In the prior art, attempts have been made to up-grade the protein content of the mixed fiber fraction from wet milling. One such process is described in U.S. Pat. No. 2,776,228 which relates to the destarching of starch-containing fibers, gluten, and mixtures thereof.

SUMMARY OF THE INVENTION

This invention relates to a process for producing an improved clean pentosan enriched pericarp from mixed fiber obtained from the hydroprocessing of corn which comprises the steps of:
 (a) drying the mixed fiber to a moisture level of from about 42% to about 60% by weight;
 (b) abrading the dried fiber to separate a clean pentosan enriched pericarp fraction and a fines fraction; and
 (c) recovering the clean pericarp fraction and the fines fraction.

This invention also relates to the clean pentosan enriched pericarp fraction which contains at least about 35%, dry weight basis, pentosans.

The invention further relates to a new mixed fiber or fines fraction which contains a starch level of at least about 40%, dry weight basis, and a pentosan content below about 20%, dry weight basis. Moreover, the invention relates to improved feed products containing at least about 35% starch, dry weight basis, produced by combining the fines fraction with corn hydroprocessing by-products selected from the group consisting of corn cleanings, spent flakes, steepwater and the like.

DESCRIPTION OF PREFERRED EMBODIMENTS

It has now been found that an improved or clean pericarp may be recovered from the mixed fiber stream of a corn wet milling operation. According to this invention, the mixed fiber stream is dewatered to a critical moisture level of from about 42% to about 60% by weight and then subjected to an abrasion which enables the separation of an improved clean pericarp fraction and an improved fines fraction containing high levels of carbohydrates and protein.

The clean corn pericarp fraction due to the high fiber content can be further processed to provide a fiber food additive, since fiber has recently been found significant to human or animal diets. Moreover, the clean pentosan enriched pericarp fraction provides a potential raw material source for the production of xylose, furfural, resins, hemicellulose gum, and cellulose.

The improved mixed fiber or fines fraction containing high levels of carbohydrate and protein provides for upgrading of the corn gluten feed to a high energy source. Moreover, some of the steepwater normally combined with the various other by-products to raise the protein content for animal feed can be saved for other desirable uses such as for fermentations and pharmaceuticals since the improved fines provide more of the desired protein content. Furthermore, it has been found that better feed pellets which are less hygroscopic can be produced using the improved fines and less steepwater according to this invention.

According to the process of this invention the mixed fiber stream may be subjected to the conventional initial dewatering operation, for example, using a mechanical press such as a Zenith press. The purpose of the dewatering operation in conventional processes is to cut energy costs and to prepare the wet milled fiber for conventional drying operations, for example flash drying or rotary drum drying. As discharged from the pressing operation, the mixed fiber is typically at a temperature of about 120°–130° F. and at a moisture level of about 62% to about 65% by weight. However in conventional processes the relatively wet fiber is then further dried and mixed with other milling by-products (i.e., corn cleanings, spent germ flakes, steepwater and the like) to produce a feed product. In conventional processes all the mixed fiber ends up in the feed product.

In the process of the instant invention, the mixed fiber stream is dewatered to a critical moisture level of from about 42% to about 60% by weight and preferably from about 50% to about 60% moisture by weight. At this critical moisture level which is lower than that of conventional processes, it has been found that, if the mixed fiber stream is subjected to mechanical abrasion, the pericarp may be further separated from the clinging endosperm fragments resulting in an improved pentosan enriched clean pericarp fraction and the improved mixed fiber or fines fraction containing high levels of carbohydrates and protein. In applying mechanical abrasion, I prefer to use a beater or impact mill, such as a so-called bran duster or impact finishers or the like for efficient abrasion and separation of the above-described fractions. In an impact mill, rotary blades abrade and mixed fiber by propelling it against a screen causing disintegration into the desired component fractions as hereinafter described.

In one such example of an abrader system fitted with a variable speed motor, the "mixed fiber" supply is fed downward into a series of rotating blades attached to the motor shaft. The rotors or beater blades strike, abrade, and propel the mixed fibers outwardly using centrifugal force impaction of particles against a surrounding screen further abrading and separating the previously described mixed fiber fraction. In the process, the improved mixed fiber or fines fraction passes through the screen while the coarser pericarp fraction is retained. Both fractions thus separated pass vertically downward into the Beater Fines Collector and the Pericarp Fiber Collector.

The following data further describes the specifications for a laboratory scale version of an abrader.

| Rotors | | Component Data Beater Screen | |
|---|---|---|---|
| Number of rotors | 12 | Cylinder | |
| Rotor diameter | ≈ 4-7/8 in. | Diameter | 5 in. |
| Blades/rotor | 4 | Height | 18 in. |
| Blade height | 1 in. | Perforations | |
| Blade spacing on | | Staggered | 3/32 in. (2.38 mm) |
| Rotor | 90° | Diameter | 1/16 in. (1.59 mm) 132 holes./in.$^2$ 41% open area |
| Installed Data | | | |
| Spacing of rotors on shaft | | | 1-1/2 in. |
| Distance between rotors | | | 1/2 in. |
| Rotor blade configuration on shaft staggered | | | 45° |
| Rotor blade - beater screen clearance | | | ≈ 1/16 in. |
| Shaft speed (0 - load) | | | ≈ 3000 rpm |
| Centrifugal force at beater screen | | | ≈ 623 g's |

It is understood that the first screening operation may take place with the abrasion process during impaction with the surrounding screen. In the practice of this invention, following abrasion, the mixed fiber is separated through a screening or classification operation into novel component fractions such that the improved mixed fiber or fines fraction passes through the screen and the coarse clean pericarp is retained for further processing if desired or dried directly for a high fiber product. It is of course possible to recycle the coarse clean pericarp for further abrasion if desired. I prefer, however, to provide enough mechanical abrasion in one pass to separate the product fractions of this invention.

If the critical moisture level for the mixed fiber is outside the desired range of this invention, efficient separation becomes difficult to impossible. For example, abrasion of the mixed fibers above about 60% moisture by weight resulted in swollen endosperm which plugged the screens and produced pericarp still containing attached endosperm. At moisture levels below about 42% by weight, the endosperm adhered tightly to the pericarp and was not readily separated by abrasion.

"Mixed corn fiber" at 64%–65% moisture was found to be too high in moisture since the endosperm plugged the openings in the beater screen with the fines being essentially extruded through the openings. In addition the coarse fiber fraction that accumulated in the cleaner at this moisture level had bits of endosperm still adhering to its surface. The "mixed fiber" stream at about 60% moisture was processed through a small bench-top abrader (5 inch Diameter×6 inch Height, 1/16 inch screen perforations) at around 3400–3500 revolutions per minute. The performance was strikingly improved at this moisture level, but a considerable amount of endosperm still adhered to the top one-third of the beater screen. Since the coarse fiber fraction collected in one pass through the small unit still appeared to have some endosperm attached to the surface of the pericarp the coarse fraction was recycled once through the unit. "Mixed corn fiber" samples at 48% moisture and 53% moisture were processed through the abrader. Fiber cleaning appeared visibly poorer and the endosperm seemed to adhere tightly to the pericarp and was not readily freed but the pericarp shattered slightly when subjected to impact. The 53% moisture sample from the first-pass dryers, on the other hand, processed well.

According to this invention, the clean pericarp fraction at the critical moisture level is separated after abrasion since it will not pass through the screening or classification operation. In this first classification or purification, I prefer to use a screen with a size from about 2,000 to about 2,400 microns since this provides adequate separation of the desired fractions. If desired, the clean pericarp can subsequently be further screened to obtain further classification of the improved fines fraction or clean pericarp. Clean pericarp fractions of this invention contain from about 35% to about 50% dry weight basis, pentosans with dietary fiber content of at least about 65% on a dry weight basis are produced according to this invention.

In subsequent screening, an ultra clean pentosan enriched pericarp fraction is obtained. The dried ultra clean pericarp may then be ground to a mesh size of less than about 100 to 200 microns as desired for use as a fiber food additive. It has been found that the separated ultra clean enriched pericarp fraction represents a recovery of up to about 75%, on a dry weight basis, of the pericarp originally present in the mixed fiber stream. This ultra clean pentosan enriched pericarp also represents from about 25% to about 35% on a dry weight basis of the original mixed fiber stream.

The abraded or improved fines fraction may be called a novel mixed fiber and represents up to about 65% dry weight basis of the original mixed fiber supply stream. The novel mixed fiber of this invention contains a starch content of at least about 40% on a dry weight basis. Moreover, the pentosan content of the novel mixed fiber is reduced to below about 20% on a dry weight basis resulting from removal of the clean pericarp fraction.

Corn gluten feed is comprised of certain by-product streams from the wet milling process. Corn gluten feed may be composed of "mixed corn fiber," spent germ flake, corn cleanings and steepwater. Corn gluten feed as manufactured may also be composed of "mixed corn fiber," corn cleanings and steepwater. In both cases concentrated steepwater is added in sufficient quantities to meet the protein specifications. The protein content of corn gluten feed should be at least 21% dry weight basis. The use of the novel mixed fiber or fines fraction of this invention in feed reduces corn gluten and steepwater requirements to meet feed protein specifications. In this invention, the energy content of the feed is increased since more starch and protein is included in the improved mixed fiber. Furthermore, steepwater as a component to meet protein specifications in gluten feed may be eliminated. The processes of this invention significantly reduce energy requirements to dry feed, eliminate the steepwater requirement, produce an improved gluten feed, and permit the manufacture of more desirable, less hydroscopic pellets with greater bulk density.

The abraded improved mixed fiber or fines fraction may be combined with other by-products to provide an improved feed product. Preferably, the abraded fines are destarched to provide even higher protein content such as described in U.S. Pat. No. 2,776,228. Improved feed products of at least 21% protein on a dry weight basis and containing starch at levels of at least 35% on a dry weight basis are produced by combining the novel mixed fiber with other corn hydroprocessing by-products such as corn cleanings, spent germ flakes, steepwater and the like.

As can be seen in the following examples, the pentosan content of the clean pentosan enriched pericarp is improved over the starting material or mixed fiber analysis. Moreover, the improved carbohydrate and protein content of the improved mixed fiber or fines fraction enables the resulting feed products with reduced steepwater to be maintained at an acceptable feed protein level and provides higher carbohydrate energy content and bulk density.

The following examples further illustrate the present invention and will enable others skilled in the art to understand it more completely. It should be understood, however, that the invention is not limited solely to the examples given below.

EXAMPLE I

Separate portions of the wet mixed fiber stream as discharged from the presses at about 120°–130° F. containing from about 64% to about 65% moisture by weight and starch from about 20% to about 40% dry weight basis, protein from about 10% to about 15% dry weight basis, and pentosan from about 25% to about 33% dry weight basis, is immediately dried to a moisture level of from about 48% to about 60% by weight. The mixed fiber at the various moisture levels is passed at around 3400–3500 rpm through the bench top abrader (5 inch Diameter×6 inch Height, 1/16 inch Screen perforations) fitted with a 2,000 micron screen and the separated clean pericarp gave the following analysis on a dry weight basis:

| Mixed Fiber Moisture Content % | Clean Corn Pericarp | | | |
|---|---|---|---|---|
| | Yield Wt. % | Starch % | Protein % | Pentosan % |
| 64–65[1,2] | 32 | 7.7 | 6.9 | — |
| 60[2] | 28 | 7.7 | 6.8 | — |
| 60[2] | 31 | 6.7 | 6.0 | 48 |
| 60[2] | 37 | 6.6 | 6.5 | 48 |
| 59[3] | 40 | 7.1 | 5.9 | 47 |
| 55[3] | 27 | 7.7 | 6.3 | 47 |
| 58[3] | 32 | 5.8 | 6.1 | 47 |
| 48[3,4] | — | — | — | — |

[1]Control as discharged from presses.
[2]Twice recycled through abrader, some clogging of screen, thus runs of short duration.
[3]One pass operation.
[4]Processed without good separation of pericarp from endosperm.

In this experiment moisture levels of above about 60% by weight causes clogging of the screens and below about 48% moisture in a one pass operation results in poor separation of endosperm from the pericarp.

EXAMPLE II

Mixed fiber at a moisture level of 60% by weight is passed twice at around 3000–3500 rpm through the bench top abrader (5 inch Diameter×6 inch Height, 1/16 inch screen perforation) and the clean pericarp fraction sized over 2,800 micron and 2,000 micron screens and aspirated to remove small bits of foreign material and the hilar layer. Results are as follows on a dry weight basis:

| Component | Yield[1] | Starch % | Protein % | Pentosan % |
|---|---|---|---|---|
| Control-Mixed Fiber Supply | 100 | 25 | 11 | 32 |
| Clean Pericarp Fractions | | | | |
| > 2,800 microns[2] | 31 | 6.1 | 5.9 | 50 |
| > 2,000 microns[2] | 6.8 | 8.9 | 9.0 | 41 |
| < 2,000 microns[3] | 27 | 14 | 11 | 34 |
| Abrader Fines | 36 | 47 | 17 | 15 |

[1]Grams produced per 100 gram supply.
[2]Aspirated to separate Heavies (i.e., heavy or more dense material).
[3]Aspiration Heavies added.

These results indicate that a significant amount of clean pericarp analyzing from about 35% to about 50% pentosans is separated from the mixed fiber stream. Moreover, the abrader fines or improved mixed fiber contain about one and one-half times the starch content and about one and one-half times the protein content that was present in the original mixed fiber.

EXAMPLE III

Three separate mixed fiber supplies are processed in one pass at 3000 rpm through the previously described laboratory abrader (5 inch Diameter × 18 inch Height) at a moisture level of about 50 to 58% and the new mixed fiber and clean pericarp are recovered. Analysis comparing the original mixed fiber supply, the improved fines, and the clean pericarp is as follows on a dry weight basis:

| Component | Mixed Fiber Supply | | | Improved Fines[1] | | | Clean Pericarp | | |
|---|---|---|---|---|---|---|---|---|---|
| Total Weight[2] | 100 | 100 | 100 | 73 | 69 | 68 | 27 | 31 | 32 |
| Starch % | 35 | 32 | 32 | 44 | 45 | 42 | 7.7 | 7.6 | 5.8 |
| Protein % | 13 | 13 | 13 | 15 | 15 | 15 | 6.3 | 6.3 | 6.1 |
| Pentosan % | 27 | 28 | 27 | 19 | 20 | 18 | 47 | 49 | 47 |
| Run No. | 1 | 2 | 3 | 1 | 2 | 3 | 1 | 2 | 3 |

[1]Containing the aspirator Heavies (i.e., the heavy or dense material).
[2]Grams produced per 100 grams supply.

These results show the distribution of the mixed fiber supply by weight into the improved mixed fiber or fines fraction and the clean pericarp fraction. Moreover, analysis shows high levels of pentosans of up to about 50% on a dry weight basis for the clean pericarp fraction and high levels of starch of up to about 45% on a dry weight basis in the improved mixed fiber or fines fraction.

EXAMPLE IV

The following analysis of the clean pentosan enriched pericarp shows the high dietary fiber content on a dry weight basis obtained using three separate mixed fiber supplies according to Example III. Dietary fiber represents the indigestible balance of material remaining after removal of starch, protein, fat and ash. Moreover, the dietary fiber has a high pentosan content and is composed of celluloses, hemicelluloses and the like.

| Component % | 1 | 2 | 3 |
|---|---|---|---|
| Dietary Fiber | 85 | 85 | 87 |
| Starch | 7.7 | 7.6 | 5.8 |
| Protein | 6.3 | 6.3 | 6.1 |
| Fat | 0.6 | 0.6 | 0.6 |
| Ash | 0.4 | 0.4 | 0.4 |

EXAMPLE V

Mixed Fiber Supply at 55% moisture is processed in one pass at 3000 rpm through the previously described laboratory abrader (5 inch Diameter × 18 inch Height), separated into the desired fractions and then the Pericarp Fraction classified through aspiration and screening operations giving the following analysis on a dry weight basis:

| Component | Total[1] Weight | Starch % | Protein % | Pentosans % |
|---|---|---|---|---|
| Mixed Fiber Supply (Control) | 100 | 35 | 13 | 27 |
| Abrader Fines Fraction | 52 | 55 | 17 | 12 |
| Pericarp Fractions[2] | | | | |
| (< 2,000 microns) Aspiration Heavies | 20 | 16 | 9.5 | 36 |
| (> 2,000 microns < 2,380 microns) Aspiration Heavies | 0.8 | 9.4 | 8.1 | 41 |
| (> 2,380 microns) Clean Pericarp | 0.3 | 7.3 | 5.9 | 44 |
| (> 2,380 microns) Clean Pericarp | 21 | 7.5 | 6.0 | 47 |
| (< 2,380 microns > 2,000 microns) | 6.5 | 8.5 | 7.2 | 44 |

[1]Grams produced per 100 grams supply.
[2]Screen size in microns.

EXAMPLE VI

Mixed fiber supply at 58% moisture is processed in one pass at 3000 rpm through the previously described laboratory abrader (5 inch Diameter × 18 inch Height), separated into desired fractions, and then the Pericarp Fraction classified through aspiration and screening operations giving the following analysis on a dry weight basis:

| Component | Total[1] Weight | Starch % | Protein % | Pentosans % |
|---|---|---|---|---|
| Mixed Fiber Supply (Control) | 100 | 32 | 13 | 28 |
| Abrader Fines Fraction | 50 | 56 | 17 | 14 |
| Pericarp Fractions[2] | | | | |
| (< 2,000 microns) | 18 | 15 | 11 | 36 |
| Aspiration Heavies (> 2,380 microns) | 0.3 | 2.3 | 3.1 | 41 |
| Clean Pericarp (> 2,380 microns) | 21 | 7.5 | 5.9 | 50 |
| Clean Pericarp (> 2,000 microns < 2,380 microns) | 10 | 7.9 | 7.0 | 47 |

[1]Grams produced per 100 grams supply.
[2]Screen size in microns.

EXAMPLE VII

Mixed fiber supply at 55% moisture is processed in one pass at 3000 rpm through the previously described laboratory abrader (5 inch Diameter × 18 inch Height), separated into desired fractions, and classified through aspiration and screening operations giving the following analysis on a dry weight basis:

| Component | Total[1] Weight | Starch % | Protein % | Pentosans % |
|---|---|---|---|---|
| Mixed Fiber Supply (Control) | 100 | 32 | 13 | 28 |
| Abrader Fines | 48 | 53 | 16 | 12 |
| Pericarp Fractions[2] | | | | |

-continued

| Component | Total[1] Weight | Starch % | Protein % | Pentosans % |
|---|---|---|---|---|
| (< 2,000 microns) Aspiration Heavies | 19 | 17 | 12 | 32 |
| (> 2,000 microns < 2,380 microns) Aspiration Heavies | 1 | 7.0 | 8.0 | 44 |
| (> 2,380 microns) Clean Pericarp | 0.3 | 3.3 | 3.5 | 41 |
| (> 2,380 microns) Clean Pericarp | 24 | 5.7 | 5.8 | 48 |
| (> 2,000 microns < 2,380 microns) | 8 | 6.2 | 7.0 | 44 |

[1]Grams produced per 100 grams supply.
[2]Screen size in microns.

EXAMPLE VIII

Analysis of Feed Products

Feed products prepared using a composite improved fines fraction of Examples V, VI and VII are compared to the energy bearing components of commercial feed as shown in the following data on a dry weight basis:

| Feed Type | Starch % | Protein % | Pentosans % |
|---|---|---|---|
| Commercial Corn Gluten Feed[1] | 28 | 21 | 19 |
| Novel Gluten Feed[2] | 39 | 21 | 13 |
| Novel Gluten Feed[3] | 21 | 21 | 25 |

[1]Conventional Mixed Fiber = 68.9%, Corn Cleanings = 7.9%, Steepwater = 23.2%
[2]Fiber Fines plus pericarp material < 2,000 microns plus Heavies = 69.7%, Corn Cleanings = 11.5%, Steepwater = 18.8%.
[3]Pericarp Material < 2,000 microns plus Heavies = 38.1%, Destarched Fines = 40.0%, Corn Cleanings = 21.9%.

These results show that excellent feed products with acceptable protein of about 21% can be made using the improved fines fraction of this invention instead of the conventional mixed fiber. Moreover, a formulation containing an acceptable protein level was obtained without the addition of steepwater. The balance of the feed product composition is indigestible material and a small amount of fat.

While the invention has been described in connection with specific embodiments thereof, it will be understood that it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth, and as fall within the scope of the invention.

We claim:

1. A process for producing an improved clean pentosan enriched pericarp from mixed fiber obtained from the hydroprocessing of corn which comprises the steps of:
   (a) drying the mixed fiber to a moisture level of from about 42% to about 60% by weight;
   (b) abrading the dried fiber to separate a clean pentosan enriched pericarp fraction and a fines fraction; and
   (c) recovering the clean pericarp fraction and the fines fraction.

2. The process according to claim 1 wherein the moisture level of the mixed fiber is from about 50% to about 60% by weight.

3. The process according to claim 1 wherein the clean pentosan enriched pericarp is recovered through a screening or classification operation.

4. The process according to claim 3 wherein the screening operation produces a clean pericarp fraction at a particle size greater than about 2,000 microns.

5. The process according to claim 1 wherein the recovered clean pericarp is ground to a particle size of about 100 to about 200 microns.

6. The process according to claim 1 wherein the abrading is performed with a beater or impact mill.

7. A process for producing an improved clean pericarp from a mixed fiber stream of a corn hydromilling process which comprises drying the mixed fiber to a critical moisture level of from about 42% to about 60% by weight; disintegrating the mixed fiber into a clean pericarp fraction containing at least about 35% dry weight basis pentosans and a mixed fiber or fines fraction representing the remaining original mixed fiber; and recovering said clean pericarp fraction and said fines fraction.

8. The process of claim 7 wherein the moisture level of the mixed fiber stream is from about 50% to about 60% by weight.

9. The process according to claim 7 wherein the recovered clean pericarp fraction is at a particle size greater than about 2,000 microns.

10. The process of claim 7 wherein said fines fraction is subjected to destarching.

* * * * *